United States Patent
Lee et al.

(10) Patent No.: US 10,603,874 B2
(45) Date of Patent: Mar. 31, 2020

(54) HYDROPHOBIC SUBSTRATE AND METHOD FOR MANUFACTURING SAME

(71) Applicant: LG CHEM, LTD., Seoul (KR)

(72) Inventors: Donghyun Lee, Daejeon (KR); Chang Yoon Lim, Daejeon (KR); Seung Heon Lee, Daejeon (KR); Song Ho Jang, Daejeon (KR); Jiehyun Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 306 days.

(21) Appl. No.: 15/502,961

(22) PCT Filed: Aug. 11, 2015

(86) PCT No.: PCT/KR2015/008415
§ 371 (c)(1),
(2) Date: Feb. 9, 2017

(87) PCT Pub. No.: WO2016/024799
PCT Pub. Date: Feb. 18, 2016

(65) Prior Publication Data
US 2017/0232711 A1    Aug. 17, 2017

(30) Foreign Application Priority Data
Aug. 14, 2014 (KR) .......... 10-2014-0106084

(51) Int. Cl.
*B32B 15/20* (2006.01)
*B32B 15/08* (2006.01)

(52) U.S. Cl.
CPC .......... *B32B 15/20* (2013.01); *B32B 15/08* (2013.01); *B32B 2307/73* (2013.01); *B32B 2311/24* (2013.01)

(58) Field of Classification Search
CPC .......... B32B 15/20; B32B 2307/73
See application file for complete search history.

(56) References Cited

U.S. PATENT DOCUMENTS

| 6,783,704 | B1 | 8/2004 | Anthes et al. |
| 2006/0110606 | A1* | 5/2006 | Luten ............ C03C 17/42 428/432 |
| 2008/0241523 | A1 | 10/2008 | Huignard et al. |

(Continued)

FOREIGN PATENT DOCUMENTS

| JP | 2008266663 A | 11/2008 |
| JP | 2011-213511 A | 10/2011 |
| JP | 2014-500163 A1 | 1/2014 |

(Continued)

OTHER PUBLICATIONS

Zhong et al., Surface Wettability of Macroporous Anodized Aluminum Oxide, ACS Applied Materials and Interfaces, ACS Publications, 2013, 5, pp. 3224-3233 (Year: 2013).*

*Primary Examiner* — Francisco W Tschen
(74) *Attorney, Agent, or Firm* — Dentons US LLP

(57) ABSTRACT

The present application relates to a hydrophobic substrate and a method for manufacturing the same. The hydrophobic substrate according to an exemplary embodiment of the present application includes: a substrate; a first layer disposed on at least one surface on the substrate and including an aluminum oxide; and a second layer disposed on the first layer and including a hydrophobic material.

3 Claims, 4 Drawing Sheets

(56) References Cited

U.S. PATENT DOCUMENTS

2012/0107558 A1    5/2012  Koval et al.

FOREIGN PATENT DOCUMENTS

| KR | 102002007410 A | 1/2002 |
| KR | 1020070018856 A | 2/2007 |
| KR | 20110026318 A | 3/2011 |
| KR | 20120101678 A | 9/2012 |
| KR | 10-2013-0097487 A | 9/2013 |

* cited by examiner

[Figure 1]
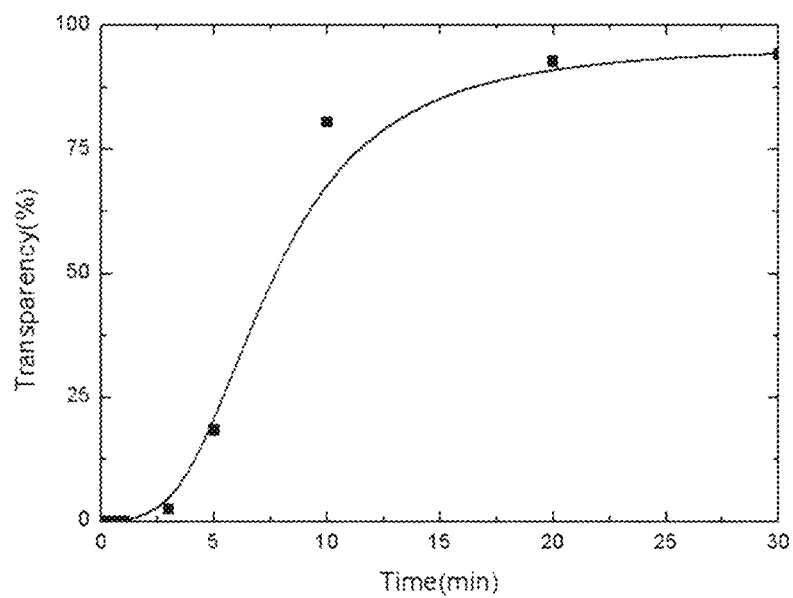

[Figure 2]
| TIME(min) | TRANSMITTANCE | PHOTOGRAPH |
|---|---|---|
| 0 | 0 | |
| 5 | 18.4 | |
| 10 | 80.5 | |
| 20 | 92.7 | |
[Figure 3]
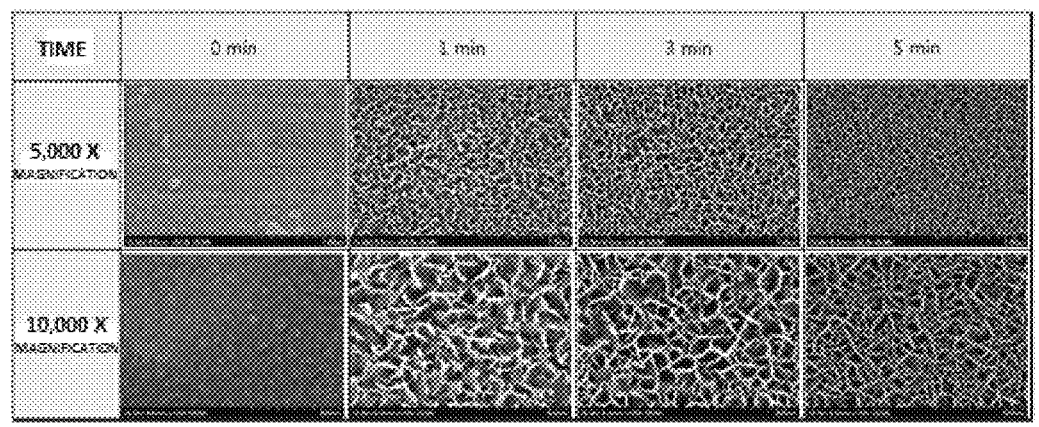

[Figure 4]
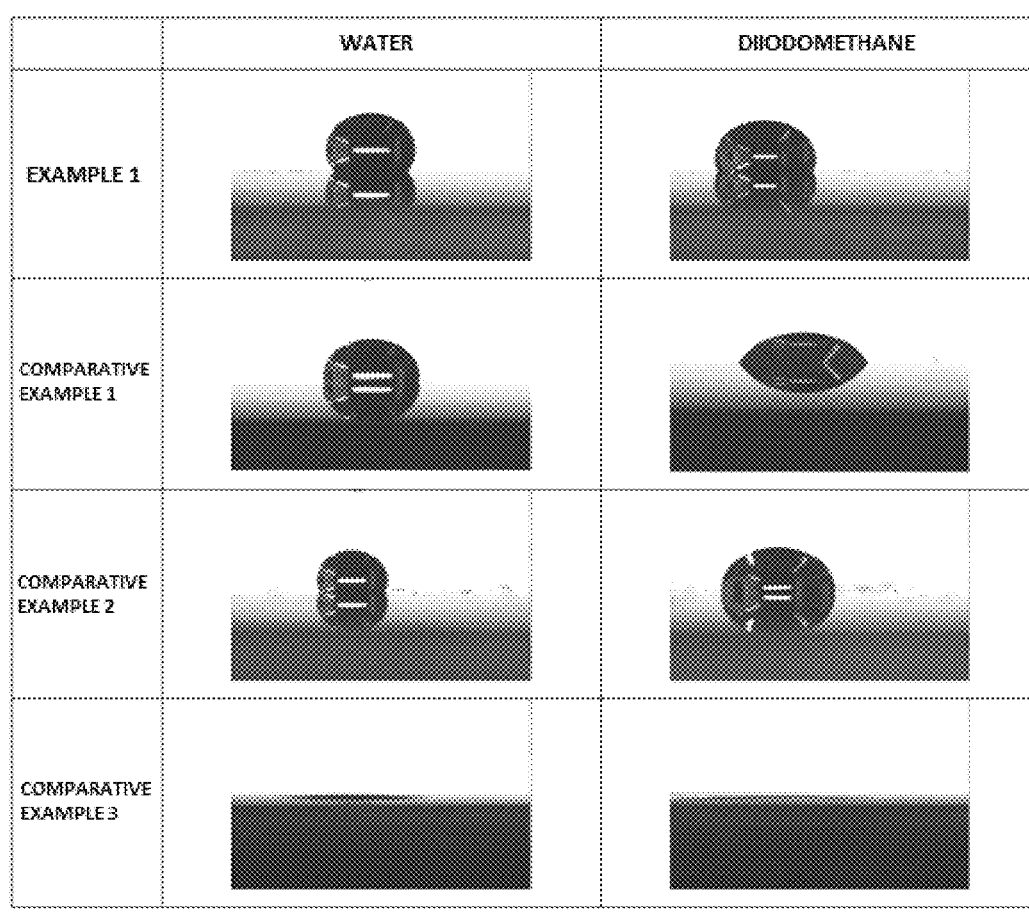

[Figure 5]
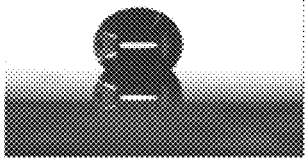

HYDROPHOBIC SUBSTRATE AND METHOD FOR MANUFACTURING SAME

This application is a National Stage Application of International Application No. PCT/KR2015/008415, filed Aug. 11, 2015, and claims the benefit of Korean Patent Application No. 10-2014-0106084, filed Aug. 14, 2014, the contents of which are incorporated herein by reference in their entirety for all purposes as if fully set forth below.

TECHNICAL FIELD

The present specification claims priority to and the benefit of Korean Patent Application No. 10-2014-0106084 filed in the Korean Intellectual Property Office on Aug. 14, 2014, the entire contents of which are incorporated herein by reference.

The present application relates to a hydrophobic substrate and a method for manufacturing the same.

BACKGROUND ART

In general, the surface of a solid such as a metal and a polymer has an inherent surface energy, and the surface energy can be evaluated by measuring the contact angle.

On the surface of the solid, when a straight line is drawn from a point where a liquid in a stationary state is brought into contact with the solid to the liquid surface, an angle with respect to the surface of the solid refers to a contact angle ($\theta$). When the contact angle ($\theta$) is small, spherical water bubbles wet the surface of the solid while losing the form thereof on the solid surface, and in this case, the surface of the solid is said to have hydrophilicity. Conversely, when the contact angle ($\theta$) is large, the liquid does not wet the surface of the solid while maintaining a spherical shape and thus is said to have hydrophobicity.

Aluminum is a lightweight metal diversely and frequently used in various fields, and there is a lot of need for imparting hydrophobicity to the surface of aluminum.

However, technologies in the related art have a problem in that the procedure is very complicated because a separate coating agent is used or a chemical solution is used.

CITATION LIST

Patent Document

Official gazette of Korean Patent Application Laid-Open No. 10-2012-0101678

DETAILED DESCRIPTION OF THE INVENTION

Technical Problem

The present application has been made in an effort to provide a substrate which is chemically stable, and has hydrophobic surface characteristics, and a method for manufacturing the same.

Technical Solution

An exemplary embodiment of the present application provides a hydrophobic substrate including:

a substrate;

a first layer disposed on at least one surface on the substrate and including an aluminum oxide; and a second layer disposed on the first layer and including a hydrophobic material.

Further, another exemplary embodiment of the present application provides a method for manufacturing a hydrophobic substrate, the method including:

forming a third layer including one or more of aluminum, aluminum nitride, and aluminum oxynitride on at least one surface on a substrate;

immersing the substrate on which the third layer is formed in water to subject the third layer to oxidation reaction and convert the third layer into a first layer including an aluminum oxide; and forming a second layer including a hydrophobic material on the first layer.

Advantageous Effects

A hydrophobic substrate according to an exemplary embodiment of the present application may include: a first layer including an aluminum oxide; and a second layer including a hydrophobic material to reinforce hydrophobic characteristics of the substrate. Further, the hydrophobic substrate according to an exemplary embodiment of the present application may include a first layer including a transparent aluminum oxide to manufacture a transparent hydrophobic substrate, and is chemically stable from the external environment.

BRIEF DESCRIPTION OF DRAWINGS

FIGS. 1 and 2 are an exemplary embodiment of the present application, and views illustrating the transmittance of a substrate over the time when being immersed in water.

FIG. 3 is an exemplary embodiment of the present application, and a view illustrating the surface state of a first layer including an aluminum oxide measured by a scanning electron microscope (SEM) over time when being immersed in water.

FIGS. 4 and 5 are an exemplary embodiment of the present application, and views illustrating the evaluation of surface characteristics of the substrates in Examples 1 and 2 and Comparative Examples 1 to 5.

BEST MODE

Hereinafter, the present application will be described in more detail.

When one member is disposed "on" another member in the present application, this includes not only a case where the one member is brought into contact with another member, but also a case where still another member is present between the two members.

When one part "includes" one constituent element in the present application, unless otherwise specifically described, this does not mean that another constituent element is excluded, but means that another constituent element may be further included.

In general, the hydrophobic treatment of a substrate can be performed through the coating of a fluorine-based material. In this case, it is known that a method of imparting unevenness to a substrate itself is effective in order to further enhance the hydrophobic characteristics. However, there is a problem in that in order to impart a specific unevenness to a substrate, a patterning is made by using a vacuum apparatus, or a nanoimprinting technology needs to be used.

The present application has been made in an effort to provide a hydrophobic substrate in which an unevenness with a nanometer or micrometer size may be formed in a wide area on the surface thereof by a simple process, and hydrophobic characteristics are further reinforced.

A hydrophobic substrate according to an exemplary embodiment of the present application includes: a substrate; a first layer disposed on at least one surface on the substrate and including an aluminum oxide; and a second layer disposed on the first layer and including a hydrophobic material.

In an exemplary embodiment of the present application, the aluminum oxide may include one or more of $Al_2O_3$, $Al(OH)_3$, and $AlO(OH)$, but is not limited thereto.

In an exemplary embodiment of the present application, the first layer including the aluminum oxide may additionally include one or more of aluminum, aluminum nitride, and aluminum oxynitride.

In an exemplary embodiment of the present application, when the hydrophobic substrate has a transmittance of 50% or more, the content of aluminum oxide in the first layer may be 50 to 100 wt %, but is not limited thereto. Further, when the hydrophobic substrate has a transmittance of less than 50%, the content of aluminum oxide in the first layer may be more than 0 and less than 50 wt %, but is not limited thereto. That is, the present application may adjust the total transmittance of the hydrophobic substrate by adjusting the content of aluminum oxide in the first layer.

In an exemplary embodiment of the present application, the surface of the first layer may have an unevenness shape. The method for manufacturing a first layer having an unevenness shape is described in a method for manufacturing a hydrophobic substrate to be described below.

The surface of the first layer may have an unevenness shape to increase a specific surface area of the first layer by 5 times to 10 times or more. The specific surface area means a surface area per unit volume.

In an exemplary embodiment of the present application, the second layer including the hydrophobic material may be formed by using materials known in the art and using a method such as coating. More specifically, the hydrophobic material may include a silane-based coupling agent containing fluorine, a silane-based coupling agent including an alkyl group, and the like, and the second layer may be formed by coating the first layer with a composition including the hydrophobic material and a solvent, but the coating method is not limited thereto.

Further, specific examples of the hydrophobic material include alkyltrichlorosilane, alkyltrimethoxysilane, alkyltriethoxysilane, polytetrafluoroethylene (PTFE), perfluoroalkoxy alkane (PFA), dichlorodimethylsilane (DDMS), perfluorodecyltrichlorosilane (FDTS), fluorooctyltrichlorosilane (FOTS), octadecyltrimethoxysilane (OTMS), and the like, but are not limited thereto.

In an exemplary embodiment of the present application, the substrate may use materials known in the art. For example, a glass substrate, a plastic substrate, and the like may be used, but the substrate is not limited thereto.

In an exemplary embodiment of the present application, a contact angle of the hydrophobic substrate with respect to water or diiodomethane may be 45 degrees or more, 90 degrees or more, and 120 degrees or more, but is not limited thereto.

In the present application, the contact angle means an angle between surfaces on a substrate in which water or diiodomethane and the substrate are brought into contact with each other. A high contact angle means a low level of wettability of the surface, and may mean excellent hydrophobic characteristics.

Therefore, a substrate having the contact angle as described above may have surface characteristics of a hydrophilic substrate having low wettability.

In addition, a method for manufacturing a hydrophobic substrate according to an exemplary embodiment of the present application include: forming a third layer including one or more of aluminum, aluminum nitride, and aluminum oxynitride on at least one surface on a substrate; immersing the substrate on which the third layer is formed in water to subject the third layer to oxidation reaction and convert the third layer into a first layer including an aluminum oxide; and forming a second layer including a hydrophobic material on the second layer.

In an exemplary embodiment of the present application, the third layer may be formed by using one or more of aluminum, aluminum nitride, and aluminum oxynitride and using sputtering, a deposition process, and the like.

In an exemplary embodiment of the present application, the first layer including an aluminum oxide may be formed on the substrate by immersing the substrate on which the third layer including one or more of aluminum, aluminum nitride, and aluminum oxynitride is formed in water. That is, one or more of aluminum, aluminum nitride, and aluminum oxynitride of the third layer may be converted into an aluminum oxide via an oxidation reaction with water. In this case, the aluminum oxide may include one or more of $Al_2O_3$, $Al(OH)_3$, and $AlO(OH)$, but is not limited thereto.

Since the volume of a material for constituting the first layer may be expanded and hydrogen gas may be generated by the oxidation reaction, the surface of the first layer may have an unevenness shape.

Further, all of one or more of aluminum, aluminum nitride, and aluminum oxynitride of the third layer may be entirely converted into an aluminum oxide, and at least a portion of one or more of aluminum, aluminum nitride, and aluminum oxynitride may be present along with the aluminum oxide in the first layer.

During the oxidation reaction, the range in which the aluminum oxide is produced may be adjusted depending on the reaction time, the water temperature, and the like.

An exemplary embodiment of the present application may form the first layer including an aluminum oxide on the substrate by immersing the substrate on which the third layer including one or more of aluminum, aluminum nitride, and aluminum oxynitride is formed in water. Therefore, the surface of the substrate may be easily modified by a simple process without using a separate coating agent, or using a chemical solution, and the method is effective in terms of costs and time because the transmittance of a hydrophobic substrate may be adjusted by adjusting the reaction time, the water temperature, and the like during the oxidation reaction. Further, since a separate coating agent or a chemical solution is not used, the method is less toxic to the human body and is eco-friendly.

In an exemplary embodiment of the present application, in a step of carrying out the oxidation reaction by immersing the substrate on which the third layer is formed in water, the water temperature may be 40° C. to 120° C., but is not limited thereto. When the water temperature is less than 40° C., the production rate of the aluminum oxide is reduced, and as a result, the time for the oxidation reaction may be increased.

Furthermore, the time for carrying out the oxidation reaction by immersing the substrate on which the third layer is formed in water may be 30 minutes or less, and 10 minutes to 30 minutes, but is not limited thereto.

Further, the specific surface area of the first layer including the aluminum oxide may be increased by 5 times to 10 times or more by carrying out the oxidation reaction by immersing the substrate on which the third layer is formed in water. The increase in specific surface area as described above is because the volume is expanded or hydrogen gas is generated while the aluminum oxide is formed, and as a result, the form of a thin film is changed. Therefore, it can be confirmed that the aluminum oxide is formed due to the change in specific surface area.

In an exemplary embodiment of the present application, the second layer including the hydrophobic material may be formed by using materials known in the art and using a method such as coating. More specifically, the hydrophobic material may include a silane-based polymer containing fluorine, and the second layer may be formed by coating the first layer with a composition including the hydrophobic material and a solvent, but the forming method is not limited thereto.

The hydrophobic substrate according to an exemplary embodiment of the present application may be a film, a sheet, and a molded article, but is not limited thereto. The hydrophobic substrate according to an exemplary embodiment of the present specification has excellent hydrophilicity and scratch resistance due to the above-described surface modification, and thus may be very suitably used as an antifogging material, an antifouling (self-cleaning) material, an antistatic material, a quick-drying material, and the like. For example, the hydrophobic substrate may be used as a coated product used for exterior walls, exteriors, inner walls, interiors, and floors of buildings, ships, aircrafts, and vehicles, and the like.

In addition, the hydrophobic substrate according to an exemplary embodiment of the present specification may be used as a coated product used for clothing materials, such as clothes, cloths, and fibers; optical products, such as optical films, optical disks, glasses, contact lenses, and goggles; displays, such as flat panels and touch panels, and display materials thereof; glass substrates of solar cells or outermost protective transparent plates of solar cells; illuminating products, such as lamps and lights, and illuminating components thereof; cooling fins of heat exchangers; cosmetic containers and container materials thereof; reflective materials, such as reflective films and reflective plates; sound barriers placed in expressways, windowpanes, mirrors, furniture, furniture materials, bathroom materials, kitchen utensils, ventilating fans, pipes, wires, electric appliances, and electric components.

MODE FOR INVENTION

Hereinafter, the present application will be described in detail with reference to Examples for specifically describing the present application. However, the Examples according to the present application may be modified in various forms, and it is not interpreted that the scope of the present application is limited to the Examples described in detail below. The Examples of the present application are provided for more completely explaining the present specification to the person with ordinary skill in the art.

EXAMPLES

Comparative Example 1

An aluminum layer (thickness 150 nm) was formed by depositing aluminum on a polyethylene terephthalate (PET) substrate, thereby manufacturing a substrate including the aluminum layer.

Comparative Example 2

An aluminum layer (thickness 150 nm) was formed by depositing aluminum on a polyethylene terephthalate (PET) substrate, thereby manufacturing a substrate including the aluminum layer.

A coating layer was formed on the aluminum layer by using a composition (Novec EGC-1720) including a silane-based polymer containing fluorine.

Comparative Example 3

An aluminum layer (thickness 150 nm) was formed by depositing aluminum on a polyethylene terephthalate (PET) substrate, thereby manufacturing a substrate including the aluminum layer.

An oxidation reaction was carried out by immersing the substrate including the aluminum layer in pure water (DI water) at 100° C., thereby forming an aluminum oxide layer on the substrate.

Example 1

An aluminum layer (thickness 150 nm) was formed by depositing aluminum on a polyethylene terephthalate (PET) substrate, thereby manufacturing a substrate including the aluminum layer.

An oxidation reaction was carried out by immersing the substrate including the aluminum layer in pure water (DI water) at 100° C., thereby forming an aluminum oxide layer on the substrate. Thereafter, a coating layer was formed on the aluminum oxide layer by using a composition (Novec EGC-1720) including a silane-based polymer containing fluorine.

Comparative Example 4

An aluminum oxynitride layer (thickness 150 nm) was formed by depositing aluminum oxynitride on a polyethylene terephthalate (PET) substrate, thereby manufacturing a substrate including the aluminum oxynitride layer.

Comparative Example 5

An aluminum oxynitride layer (thickness 150 nm) was formed by depositing aluminum oxynitride on a polyethylene terephthalate (PET) substrate, thereby manufacturing a substrate including the aluminum oxynitride layer.

An oxidation reaction was carried out by immersing the substrate including the aluminum oxynitride layer in pure water (DI water) at 100° C., thereby forming an aluminum oxide layer on the substrate.

Example 2

An aluminum oxynitride layer (thickness 150 nm) was formed by depositing aluminum oxynitride on a polyethylene terephthalate (PET) substrate, thereby manufacturing a substrate including the aluminum oxynitride layer.

An oxidation reaction was carried out by immersing the substrate including the aluminum oxynitride layer in pure water (DI water) at 100° C., thereby forming an aluminum oxide layer on the substrate. Thereafter, a coating layer was formed on the aluminum oxide layer by using a composition (Novec EGC-1720) including a silane-based polymer containing fluorine.

Experimental Example 1

When the oxidation reaction in Example 1 was carried out, the transmittance of the substrate was measured over the time when the substrate was immersed in pure water (DI water) at 100° C., and the results are illustrated in the following FIGS. 1 and 2.

According to the results of the following FIGS. 1 and 2, a transmittance of 18.4% was exhibited 5 minutes after starting the oxidation reaction, a transmittance of 80.5% was exhibited 10 minutes starting the oxidation reaction, and a transmittance of 92.7% was exhibited 20 minutes after starting the oxidation reaction. Further, the haze was decreased from 2.0 to 1.2, and thus exhibited a phenomenon in which the haze was converged after a predetermined time.

Experimental Example 2

When the oxidation reaction in Example 1 was carried out, the surface state of the first layer including the aluminum oxide was measured by a scanning electron microscope (SEM) over time when the substrate was immersed in pure water (DI water) at 100° C., and the results are shown in the following FIG. 3.

According to the results of the following FIG. 3, it can be seen that due to the generation of hydrogen gas along with the expansion of the volume in the oxidation reaction process of the aluminum layer, irregular shapes with a nanometer or micrometer size are formed on the surface.

Experimental Example 3

The surface characteristics of the substrates in Examples 1 and 2 and Comparative Examples 1 to 5 were evaluated, and are shown in the following FIG. 4 and Table 1. The surface energy, polydispersity, and polarity characteristics of the following Table 1 were measured by using a DSA100 measuring machine and using deionized water (DIW) and diiodomethane.

TABLE 1

| | Surface energy (surface energy, dyn/cm) | Polydispersity (disperse, dyn/cm) | Polarity (polar, dyn/cm) |
|---|---|---|---|
| Example 1 | 6.21 | 5.61 | 0.60 |
| Example 2 | 4.87 | 4.84 | 0.03 |
| Comparative Example 1 | 28.92 | 27.49 | 1.43 |
| Comparative Example 2 | 15.03 | 14.45 | 0.58 |
| Comparative Example 3 | 76.83 | 38.61 | 38.22 |
| Comparative Example 4 | 32.89 | 31.47 | 1.43 |
| Comparative Example 5 | 76.86 | 38.64 | 38.22 |

As shown in the results, the hydrophobic substrate according to an exemplary embodiment of the present application may include: the first layer including an aluminum oxide; and the second layer including a hydrophobic material, thereby reinforcing hydrophobic characteristics of the substrate. Further, the hydrophobic substrate according to an exemplary embodiment of the present application may include the first layer including a transparent aluminum oxide to manufacture a transparent hydrophobic substrate, and is chemically stable from the external environment.

The invention claimed is:

1. A method for manufacturing a hydrophobic substrate, the method consisting essentially of:
    forming a third layer comprising aluminum oxynitride on at least one surface of a substrate;
    immersing the substrate on which the third layer is formed in water to subject the third layer to oxidation reaction and convert the third layer into a first layer comprising an aluminum oxide; and
    forming a second layer comprising a hydrophobic material on the first layer,
    wherein a time for carrying out the oxidation reaction of the third layer is less than 30 minutes, and wherein a water temperature is 40° C. to 120° C.

2. The method of claim 1, wherein the hydrophobic material is selected from the group consisting of a silane-based coupling agent containing fluorine and a silane-based coupling agent comprising an alkyl group.

3. The method of claim 1, wherein the hydrophobic material is selected from the group consisting of alkyltrichlorosilane, alkyltrimethoxysilane, alkyltriethoxysilane, polytetrafluoroethylene (PTFE), perfluoroalkoxy alkane (PFA), dichlorodimethylsilane (DDMS), perfluorodecyltrichlorosilane (FDTS), fluorooctyltrichlorosilane (FOTS), and octadecyltrimethoxysilane (OTMS).

* * * * *